May 1, 1951 L. C. BURTON 2,551,314

TRACTOR WITH LEVELING DEVICE

Filed Sept. 27, 1946 8 Sheets-Sheet 1

INVENTOR
LAWRENCE C. BURTON
BY Ely & Frye
ATTORNEYS

May 1, 1951 L. C. BURTON 2,551,314

TRACTOR WITH LEVELING DEVICE

Filed Sept. 27, 1946 8 Sheets-Sheet 2

INVENTOR
LAWRENCE C. BURTON

BY Ely & Frye

ATTORNEYS

May 1, 1951 L. C. BURTON 2,551,314

TRACTOR WITH LEVELING DEVICE

Filed Sept. 27, 1946 8 Sheets-Sheet 3

INVENTOR
LAWRENCE C. BURTON

BY Ely & Frye

ATTORNEYS

May 1, 1951 L. C. BURTON 2,551,314

TRACTOR WITH LEVELING DEVICE

Filed Sept. 27, 1946 8 Sheets-Sheet 4

INVENTOR
LAWRENCE C. BURTON
BY Ely & Frye
ATTORNEYS

May 1, 1951 L. C. BURTON 2,551,314

TRACTOR WITH LEVELING DEVICE

Filed Sept. 27, 1946 8 Sheets-Sheet 5

INVENTOR
LAWRENCE C. BURTON

BY Ely & Frye

ATTORNEYS

May 1, 1951 L. C. BURTON 2,551,314

TRACTOR WITH LEVELING DEVICE

Filed Sept. 27, 1946 8 Sheets-Sheet 6

INVENTOR
LAWRENCE C. BURTON

BY Ely & Frye

ATTORNEYS

May 1, 1951 L. C. BURTON 2,551,314

TRACTOR WITH LEVELING DEVICE

Filed Sept. 27, 1946 8 Sheets-Sheet 7

INVENTOR
LAWRENCE C. BURTON

BY Ely & Frye

ATTORNEYS

May 1, 1951 L. C. BURTON 2,551,314

TRACTOR WITH LEVELING DEVICE

Filed Sept. 27, 1946 8 Sheets-Sheet 8

INVENTOR
LAWRENCE C. BURTON
BY Ely & Frye
ATTORNEYS

Patented May 1, 1951 2,551,314

UNITED STATES PATENT OFFICE 2,551,314

TRACTOR WITH LEVELING DEVICE

Lawrence C. Burton, Akron, Ohio

Application September 27, 1946, Serial No. 699,773

8 Claims. (Cl. 180—41)

This invention relates to tractors, and more especially it relates to tractors employed in off-the-road operations where the terrain may be rough, uneven, or hilly.

When tractors of conventional construction, of three-wheel or four-wheel type, are employed on uneven ground such that the vehicle is tilted laterally, the weight of the tractor is thrown mostly onto the lowermost wheel or wheels, with the result that there is less traction on the uppermost wheel or wheels, and greater strain is imposed upon the motor to drive the vehicle. Such a situation may occur in contour plowing, or plowing with one of the driving wheels of the tractor in a previously turned furrow, or it may occur in ditching operations where the tractor is employed to propel a scraper or bull-dozer. Furthermore, lateral tilting to an excessive extent may, if the tractor has a relatively high center of gravity, result in unstable equilibrium and upsetting of the vehicle with serious consequences to operator and equipment. Moreover lateral tilting of a tractor not only makes for discomfort to the operator, but also adds to the difficulty of operation. It is to the relief of the undesirable conditions set forth that this invention primarily is directed.

The chief objects of the invention are to provide an improved tractor that, within substantial limits, may operate upon uneven terrain without lateral tilting; to provide a tractor having a greater factor of safety than conventional tractors; to provide a tractor that will not be laborious for the operator to operate; and to provide a tractor that automatically is self-leveling when laterally tilted. More specifically the invention aims to provide a tractor with driving wheels that have a substantial range of movement in their respective planes; to provide a tractor of which the driving wheel on one side thereof moves in its own plane in one direction while the driving wheel on the other side thereof moves in its own plane in the opposite direction; to provide means for driving the said wheels in all positions throughout their entire range of relative movement; and to provide means for braking said wheels throughout their entire range of relative movement. Other objects will be manifest as the description proceeds.

Figure 1:
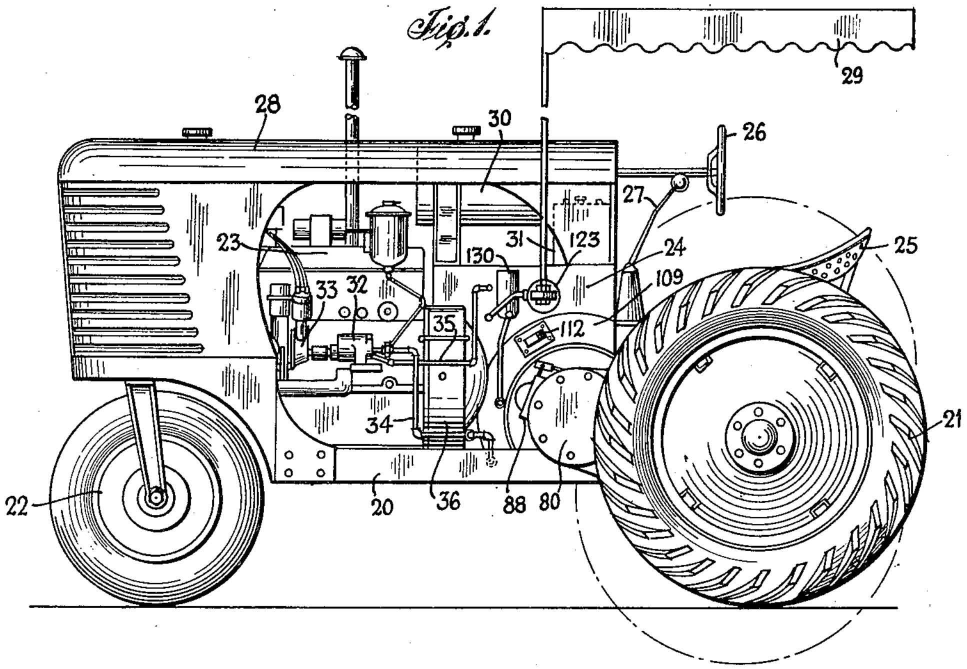
Fig. 1 is a side elevation of a complete tractor embodying the invention as it appears on level ground.
Figure 2:
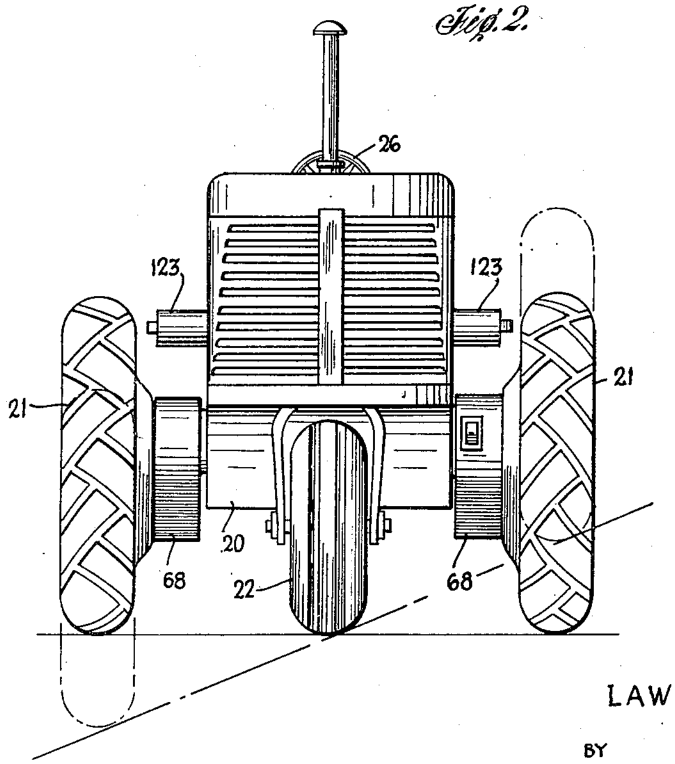
Fig. 2 is a front elevation thereof, the action of the wheels on sloping ground being indicated in broken lines.

Referring to Figs. 1 and 2 of the drawings, there is shown an improved tractor that comprises a frame or chassis 20, power-driven wheels 21, 21 at the rear end thereof, a single dirigible wheel 22 on the front end thereof, an internal combustion engine or motor 23 at the front thereof, and a casing or housing 24 connected to the rear end of the motor and containing the conventional transmission gears, means for elevating one of the rear wheels while depressing the other, and a valve means automatically controlling the elevating and depressing of the rear wheels in response to transverse tilting of the tractor due to uneven terrain. The tractor has a seat 25 for an operator at the rear end thereof, and there is a steering wheel 26 and gear-shift lever 27 in suitable proximity to said seat. In Fig. 1 there is shown a hood 28 over the motor 23 and housing 24, and a canopy 29 over the operator's seat. A fuel supply tank 30 and battery 31 are supported upon the housing 24 beneath the hood 28. The motor 23 is of conventional construction except that it has an additional oil pump 32 mounted upon the side thereof and driven by the same shaft that drives the ignition mechanism 33 of the motor, said pump having an inlet pipe 34 leading thereinto and an outlet pressure pipe 35 extending therefrom. There is a conventional clutch (not shown) between the crank shaft of the motor and the propeller shaft of the vehicle, said clutch being located in the hollow, drum-like formation 36 that is a part of the housing 24, on the end of the latter that abuts the crank case of motor 23.

Figures 5, 6:
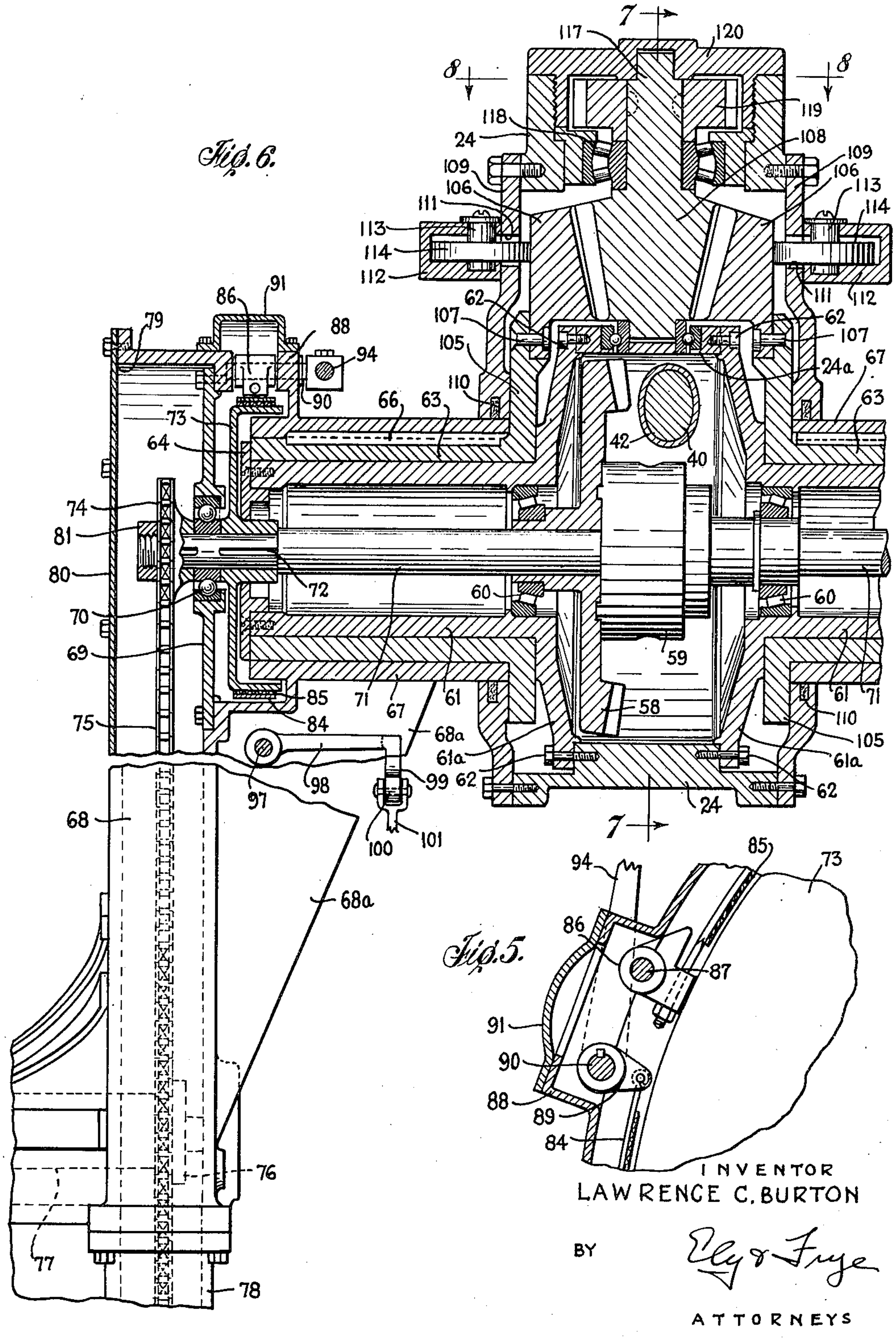
Fig. 5 is a section on the line 5—5 of Fig. 4.
Fig. 6 is a section on the line 6—6 of Fig. 3.
Figure 7:
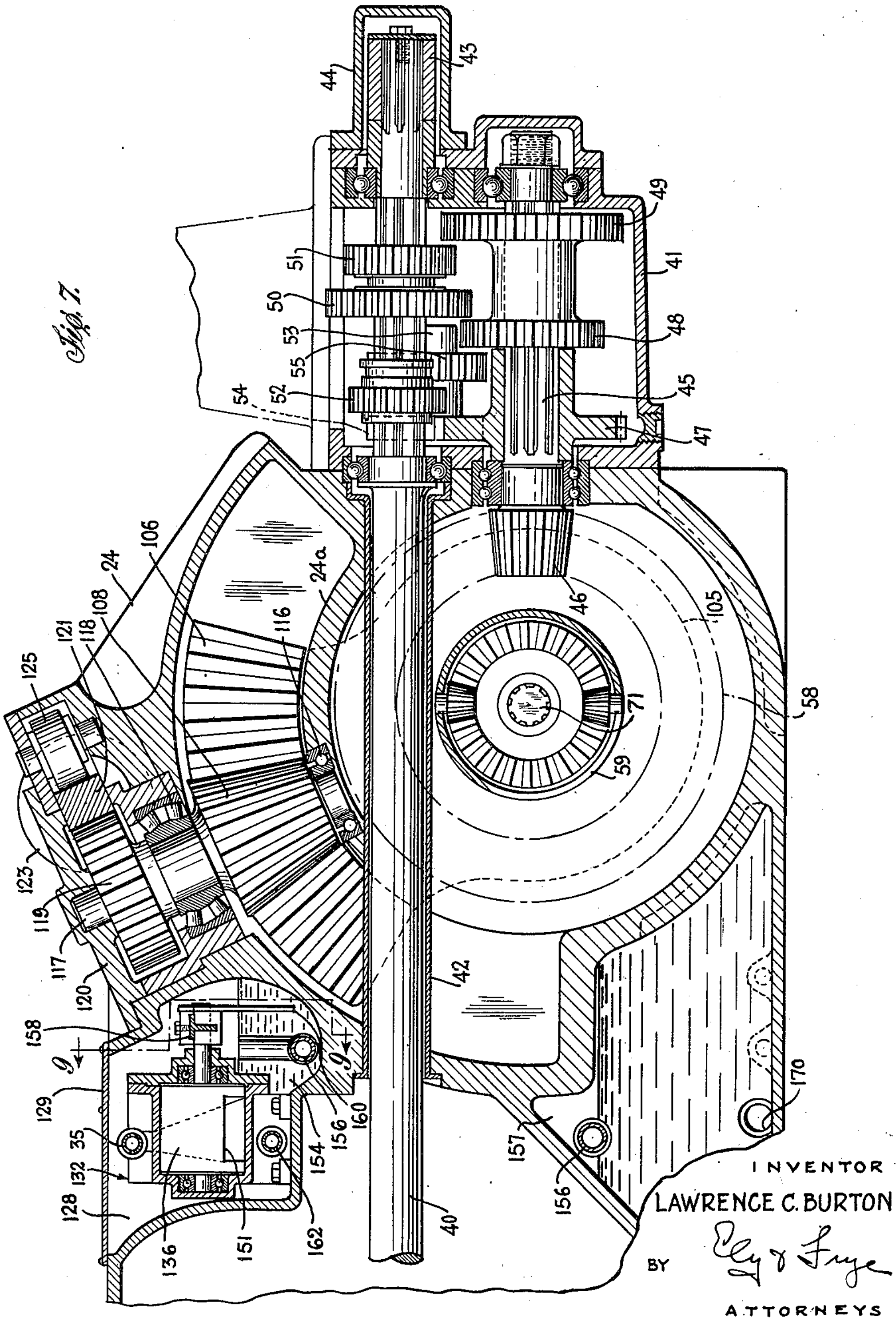
Fig. 7 is a section taken substantially on the line 7—7 of Fig. 6.

The propeller shaft of the vehicle is designated 40 and is shown in Figs. 6 and 7 of the drawings. It extends horizontally through the housing 24, and at the rear of the latter is located within a transmission casing 41 mounted upon the rear end of housing 24. Within the latter the shaft 40 is enclosed in a protective sleeve 42. The rear end of shaft 40 projects from the rear wall of the transmission casing 41 and is splined to enable a pulley or other power-transmitting device to be mounted thereon, thus providing a "power take-off." The projecting rear end of the shaft is protected by a removable sleeve 43, and a cap 44 that encloses the same.

Also journaled in the transmission casing 41 is a countershaft 45 that is positioned parallel to shaft 40 in spaced relation thereto, the front end of countershaft 45 extending into housing 24 and provided with a pinion 46 thereon. Driving connection between shaft 40 and countershaft 45 is effected selectively by the usual shiftable gear mechanism of which gears 47, 48, and 49 are splined upon countershaft 45 and restrained against movement longitudinally thereof, said gears being laterally spaced apart from each other. Splined upon shaft 40 and movable longitudinally thereof is a unitary structure comprising two gears 50, 51 of different sizes, which gears are disposed between gears 48, 49 aforementioned. Said structure may be shifted axially in one direction to mesh gear 50 with gear 48, or in the opposite direction to mesh gear 51 with gear 49. Also slidably splined on shaft 40 is a gear 52 that may be meshed with gear 47 on the countershaft. The relative sizes of the aforementioned gears is such as to enable the countershaft 45 to be driven at three different speeds, all in the same direction. For driving the countershaft in reverse direction, a second countershaft (not shown) is journaled in the wall of the casing 41 and a boss 53 formed thereon, said second countershaft being parallel to and laterally offset from countershaft 45. Said second countershaft has journaled thereon a unitary gear structure comprising a gear 54 that is meshed with gear 47, and a gear 55 spaced rearwardly therefrom and so positioned as to mesh with gear 52 when the latter is shifted rearwardly. For shifting gears 50, 51 as a unit and for shifting gear 52, the usual shifting forks to be operated by lever 27, Fig. 1 are provided, but since these elements are well known in the art and constitute no part of the present invention, it is believed their omission herefrom is permissible.

The pinion 46 on countershaft 45 is meshed with a ring gear 58, Fig. 7 secured to a conventional differential gear unit 59. The differential unit 59, of which ring gear 58 is a part, is journaled at opposite sides thereof in bearings 60, 60, (Fig. 6) which bearings are mounted interiorly of respective tubular axles 61, 61, at the inner ends of the latter. The axles 61 have their inner, confronting end portions formed with respective flanges 61*a*, and said flanges are fixedly attached, by cap screws 62, to opposite sides of a substantially annular partition 24*a* formed within the housing 24 and accessible through lateral openings of larger size in opposite sidewalls of the housing. Journaled upon each axle 61 is a tubular sleeve 63, which sleeve is retained on the axle by an annular cap-plate 64 that is secured to the outer end of said axle. At their inner ends each sleeve 63 is provided with means for oscillating the sleeves in reverse direction to each other, as presently will be described.

Mounted upon each sleeve 63 and keyed thereto at 66 is the hub portion 67 of a wheel-arm 68, said wheel-arms being hollow, and the hub portions 67 thereof extending perpendicular to the planes of the arms, at one end thereof. Interiorly of each arm 68, concentrically of the axis of its hub 67, is mounted an annular bearing plate 69, and mounted therein, at the axis thereof, is a bearing 70 in which is journaled the outer end portion of a jackshaft 71, the other end of the latter being operatively associated with the differential unit 59 in the usual manner so as to be driven thereby. The end portion of each jackshaft 71 that is received in bearing 70 is of reduced diameter, and keyed on said reduced portion, on the inner side of said bearing at 72 is a brake drum 73. Keyed onto the reduced portion of jackshaft 71, on the outer side of said bearing 70 is a sprocket 74, and trained about the latter is a sprocket chain 75 that also is trained about a sprocket 76 mounted upon a wheel spindle 77 that is journaled in the outer end of the wheel arm 68, remote from the hub-end of said wheel arm. The spindles 77 project from the outwardly presented sides of the respective wheel arms and carry the respective wheels 21. Each wheel arm 68 has a cap structure 78 on the outer or free end thereof giving access to the sprocket 76, and has an opening 79 concentric with the axis of hub 67 giving access to sprocket 74 and bearing plate 69, said opening 79 being provided with a closure plate 80. A nut 81 threaded onto the outer end of jackshaft 71 retains the sprocket 74 on the reduced end portion thereof. The arrangement is such that the propeller shaft 40 drives both wheels 21 through the agency of the differential unit 59. As shown in Fig. 1, the wheel arms 68 extend substantially horizontally of their hub portions, toward the rear of the tractor, when the latter is on level ground.

Each brake drum 73 is encircled by a brake band 84 having the usual facing or lining of friction material 85. As is best shown in Fig. 5, one end of brake band 84 is adjustably connected to a block 86 that is carried upon a pin 87, the latter being journaled for limited angular movement in the opposite walls of a box-like structure 88 formed locally upon the arm-hub 67. The other end of brake band 84 is connected to a short brake-lever 89 that is located within the structure 88, said lever being fixedly mounted upon a rockshaft 90 that is journaled in opposite walls of the structure 88 and projects from one side thereof. The said structure 88 is formed with an opening that is closed by a cap 91, whereby access is had to the mechanism located interiorly of said structure. The arrangement is such that angular movement of the rockshaft 90, in counter-clockwise direction as viewed in Fig. 5, will effect tightening of the brake band about the brake drum 73.

Figures 3, 4:
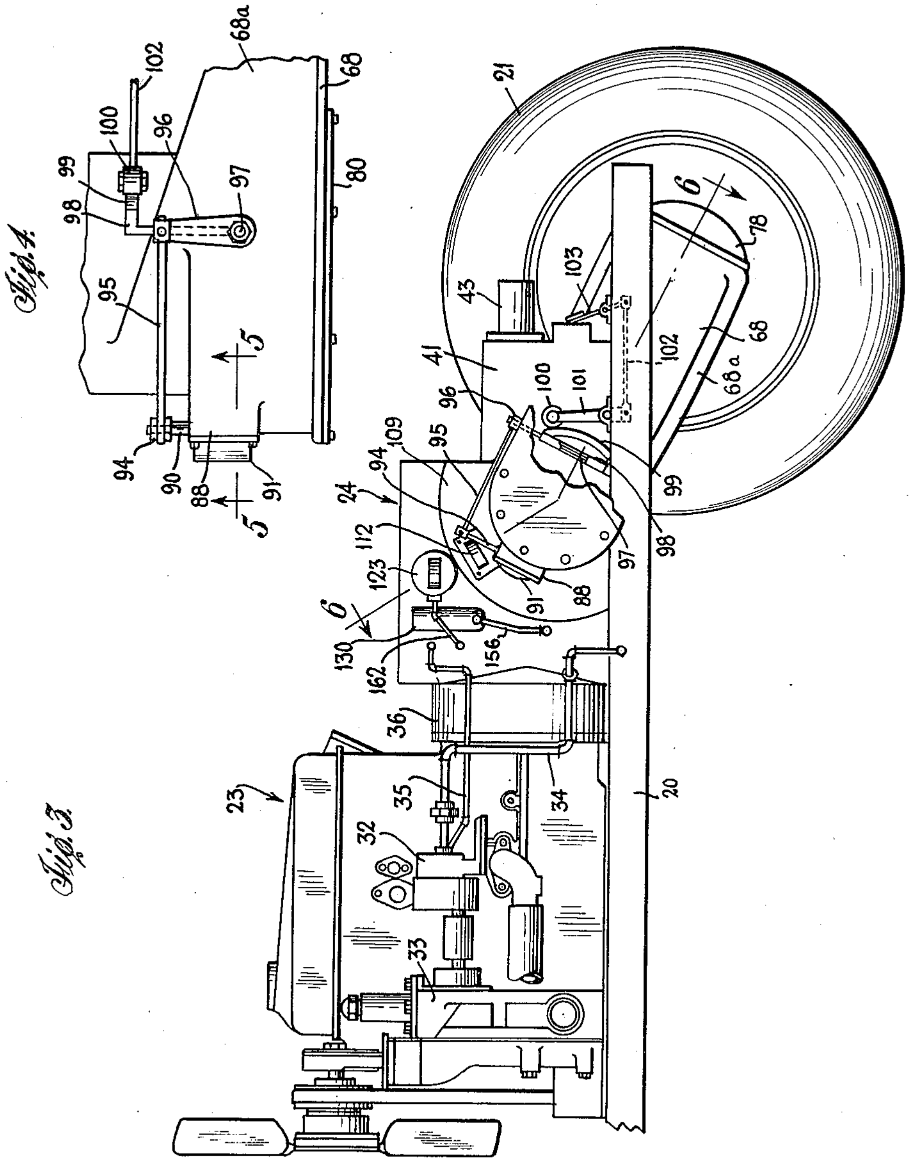
Fig. 3 is a side elevation of the power plant and associated parts of the tractor.
Fig. 4 is a fragmentary plan view of the wheel-braking mechanism shown in Fig. 3.

Exteriorly of the structure 88 the rockshaft 90 has a lever 94 mounted thereon, which lever is connected by a link 95, Figs. 3 and 4, to a lever arm 96 that is mounted upon the upper end of a shaft 97, the latter being journaled in a pair of reinforcing webs 68*a*, 68*a* formed on the rear face of the wheel arm 68. Between the webs 68*a* the shaft 97 carries an angular arm 98, which arm is formed with a smooth arcuate surface 99 that is concentric with the axis of the arm-hub 67, as is most clearly shown in Fig. 3. Engaging the arcuate surface 99 of arm 98 is a roller 100 journaled in one end of a lever of the first class 101 that is pivotally mounted upon the chassis 20, the other end of lever 101 being connected by a link 102 to a brake pedal 103 pivotally mounted on chassis 20. The arrangement is such that when the brake pedal 103 is depressed, the lever 101 is urged against arcuate surface 99 of arm 98, thus turning shaft 97 angularly and thereby tightening brake band 84 about brake drum 73 by means of the operatively interposed links and levers described. The feature of the arcuate surface 99 on arm 98 makes it possible to operate the brake in any and all angular operative positions of the wheel arm 68. Each of the wheel arms 68 of the machine is equipped with brake mechanism such as that described, there being two brake pedals 103 conveniently located for the operator who rides in seat 25. The arrangement is such that the operator concurrently may apply the brakes to the drives of both wheels 21, to slow down or stop the tractor, or he may apply the brake to the drive of but one wheel 21 to stop rotation thereof while the drive of the other wheel 21 continues to function, thus enabling the tractor to turn right or left or to turn completely around on a relatively short radius.

The wheel-arms 68 are turned angularly about the axis of their aligned hubs 67 by means of the sleeves 63 to which the respective hubs are keyed. To this end each sleeve 63 has its inner end formed with an outwardly extending radial flange 105, which flange is locally formed as a seat for a bevel gear segment 106 that is secured to the perimeter thereof by rivets 107. The gear segments are disposed in confronting relation, and both mesh with a bevel pinion 108 interposed therebetween. Each segment 106 extends in an arc of about 75 degrees, and the two segments are in transverse alignment, with the pinion 108 located midway between the ends thereof, when the tractor rests upon level terrain and the wheels 21 are in axial alignment transversely of the tractor. By the turning of pinion 108, the segments 106 and sleeves 63 to which they are attached are caused to turn angularly or oscillate about the axis of said sleeves, in opposite directions, and thereby to elevate one wheel 21 while lowering the other. The sleeve flanges 105 and gear segments 106 are located interiorly of the housing 24, and are accessible through lateral openings in the opposite sidewalls of the housing, which openings are covered by respective annular cover-plates 109. The inner circumference of each plate 109 fits closely about one of the hubs 67, and carries an oil seal 110 to prevent the escape of lubricant from the housing at this point. Each cover plate 109 is formed with a slot 111 in the region thereof that is transversely opposite the pinion 108, and a semi-circular bearing cup 112 is mounted on the outer face of the cover plate over the slot 111 therein. Journaled in each bearing cup 112 is a short shaft or spindle 113 on which is mounted a disc 114, which disc 114 extends through the slot 111 and has its perimeter in rolling contact with the rear face of a gear segment 106. The discs 114 function to prevent spreading of the segments 106 due to the thrust of the pinion 108.

Figure 8:
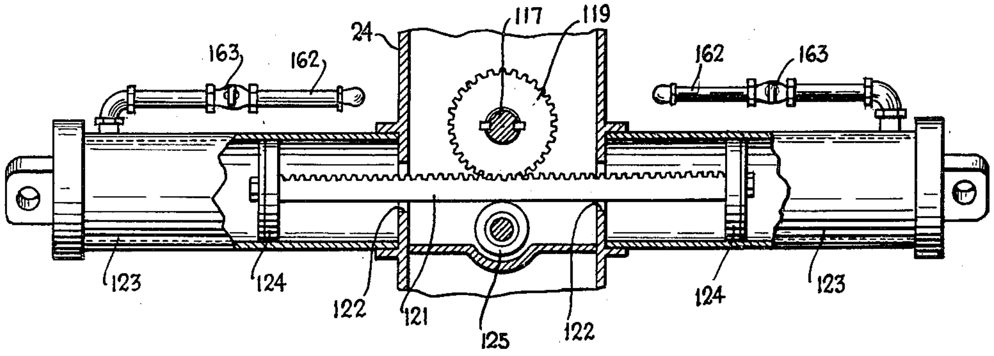
Fig. 8 is a section on the line 8—8 of Fig. 6, part being shown in section and a part in elevation.

At its smaller or inner end the pinion 108 is formed with an axial trunion that is journaled in a bearing 116 mounted in the partition 24*a* within the housing 24. At its opposite or larger end the pinion 108 is formed with an integral axial stem 117 that is journaled in a bearing 118 located immediately above the pinion. Above bearing 118 the stem 117 has a spur pinion 119 keyed thereto, the latter being covered by a cap plate 120 that is formed with a recess to receive the reduced end portion of stem 117. Meshed with the spur pinion 119 is a rack 121 that is disposed transversely of the housing 24, said rack projecting through apertures 122 formed in the respective sidewalls of said housing and extending into respective single acting fluid pressure operated cylinders 123,123 (Fig. 8) mounted in axial alignment on opposite sidewalls of the housing 24, exteriorly thereof. Each cylinder 123 comprises a piston 124, which piston is connected to the end of the rack 121 that is disposed in said cylinder. The arrangement is such that the rack may be reciprocated to effect oscillation of the pinions 119 and 108 by the charging of one cylinder 123 with concurrent discharging of the other cylinder 123. A roller 125 that is suitably journaled in the housing 24 engages the back of rack 121 at the region where the latter meshes with pinion 119, to hold said rack and pinion firmly in mesh against operational stresses.

Figure 9:
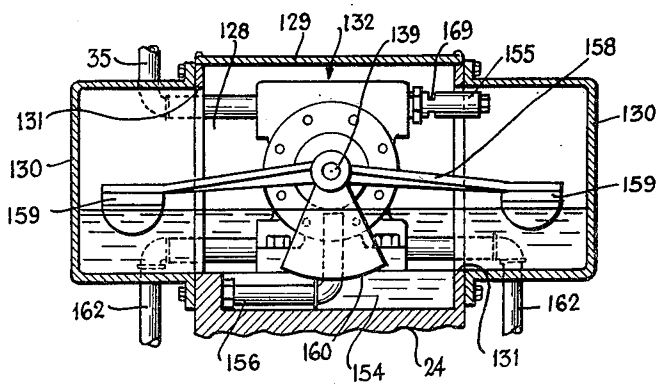
Fig. 9 is a section on the line 9—9 of Fig. 7 showing the mechanism that automatically operates the main valve of the apparatus.

The charging and discharging of cylinders 123 is effected automatically by means responsive to lateral tilting of the tractor. To this end the housing 24 is formed interiorly with a chamber 128 near the top thereof (Fig. 7), which chamber is provided with a cover 129. The volume of the chamber 128 is increased by means of hollow box-shaped blisters 130, 130, (Fig. 9) that are mounted upon opposite sidewalls of the housing 24, exteriorly thereof, said blisters having communication with the chamber 128 through openings 131 in the respective sidewalls of the chamber. Mounted within said chamber 128, at the bottom thereof, is a rotary, two-way valve that is designated as a whole by the numeral 132, said valve being shown in detail in Figs. 11, 12, and 13. Said valve 132 comprises a casing 133 in which is an axial bore 134 having a metal lining or bushing 135, and positioned within said bore is a cylindrical plug or rotor 136. The bore 134 is closed at the rear by the rear wall of the casing 133, and at the front is closed by a cover plate 137. The plug or rotor 136 is formed at each end with an integral axial spindle, that at the rear being designated 138 and that at the front being designated 139, the axis of said spindles being disposed in the central longitudinal plane of the tractor. Spindle 138 is relatively short and is journaled in a bearing 140 seated in a recess in the rear wall of the valve casing. Spindle 139 is relatively long and is journaled in a bearing 141 mounted in the cover plate 137, said spindle extending through an aperture in said cover plate.

Figures 11, 12, 13:
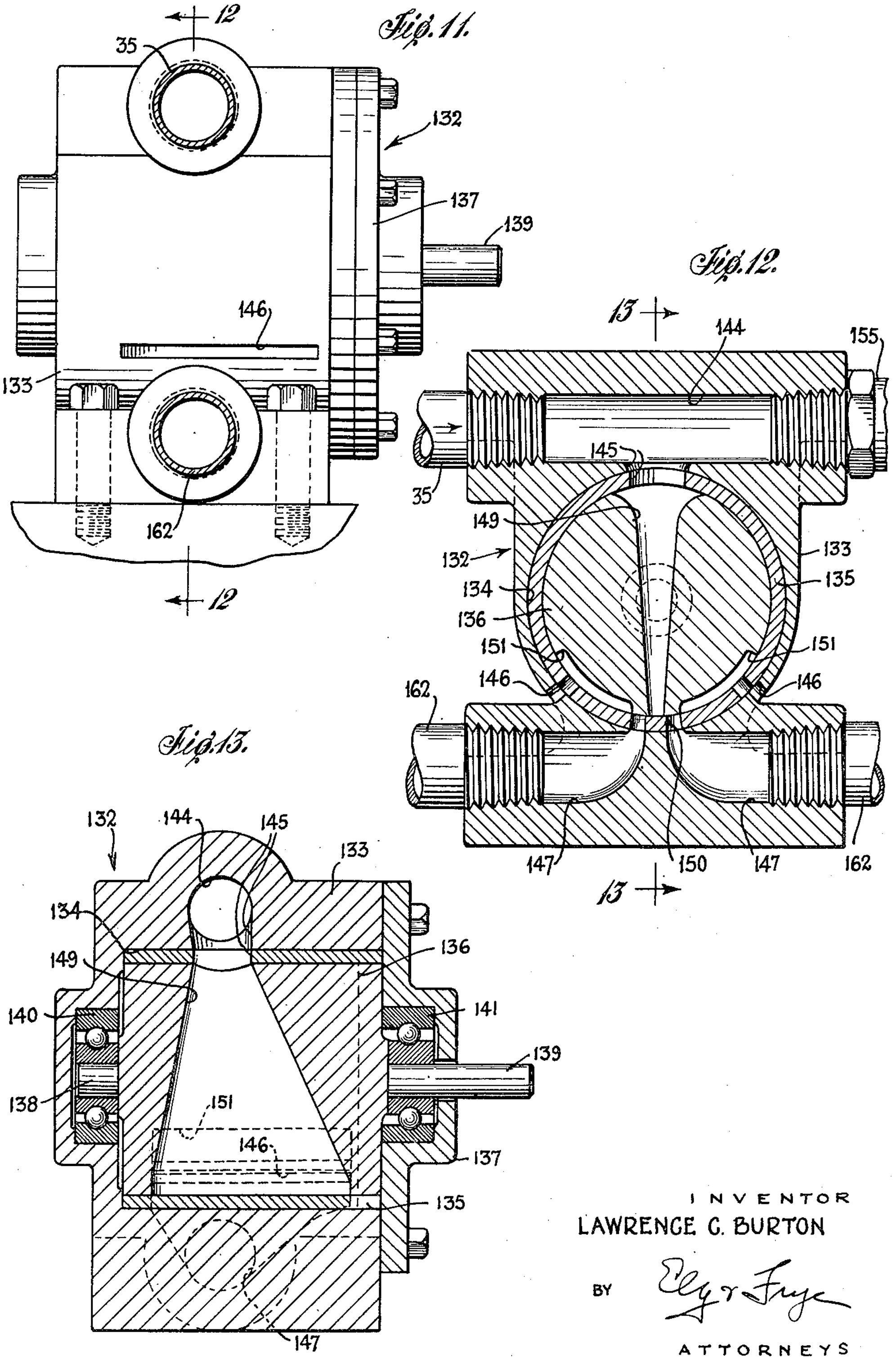
Fig. 11 is a side elevation of the main valve structure of the apparatus.
Fig. 12 is a section on the line 12, 12 of Fig. 11.
Fig. 13 is a section on the line 13, 13 of Fig. 12.

Formed in the casing 133 at the top thereof is a passage or duct 144 that extends transversely of the casing, above the rotor 136. Extending downwardly from duct 144, in the central vertical plane of the valve, is a relatively short duct 145 that extends through the lining 135, said ducts 144, 145 constituting inlets for the reception of pressure fluid to the valve. Opposite sides of the casing 133 are formed with elongate, longitudinally extending slots 146, 146, which slots extend through the casing wall and lining 135, and constitute outlet ports of the valve. At the bottom of the valve casing, on opposite sides thereof, are respective ducts 147, 147, which ducts are axially aligned, and extend toward each other interiorly of the casing, the inner end portions thereof being elongated axially of the valve and narrowed transversely thereof, said inner end portions extending in parallelism through the lining 135 in slightly spaced relation on opposite sides of the central vertical plane of the valve. The plug or rotor 136 is formed with a duct 149 extending diametrically therethrough, which duct is disposed in a vertical plane, as shown in Fig. 12, when the tractor is on level horizontal terrain, with its upper end in registry with duct 145 in the casing. The upper or inlet end of duct 149 is circular, and has a flared orifice so as to continue at least partly in registry with duct 145 when the rotor oscillates in either direction to a substantial degree. The lower or discharge end of duct 149 is rectangular in shape with its longer dimension disposed longitudinally of the valve. When the tractor is on level horizontal terrain, the discharge end of duct 149 is disposed flush against the partition or portion 150 of lining 135 that is located between the adjacent inner ends of ducts 147, whereby duct 149 is closed and no fluid is discharged therefrom. At opposite sides of the discharge end of duct 149 the peripheral face of rotor 136 is formed with respective, relatively shallow recesses 151, 151. The latter are of general rectangular shape, and in length are coextensive with the slots 146 and inner ends of the ducts 147. Circumferentially of the rotor, the width of the recesses 151 is sufficient to enable the same concurrently to provide communication between a slot 146 and the inner end of a duct 147, upon occasion, such as when the rotor 136 is oscillated due to lateral tilting of the tractor, as subsequently will be explained. The adjacent margins of the recesses 151 are spaced a sufficient distance each side of the discharge end of duct 149 as not to register with the inner ends of ducts 147, as is clearly shown in Fig. 12, except when the rotor 136 is rotated from normal position.

Oscillation or angular movement of the rotor 136 of valve 132 is effected automatically, and to an extent that is proportionate to lateral tilting of the tractor. To this end the lower portion of the chamber 128 is constituted as a sump 154, Figs. 7 and 9, in which a determinate amount of fluid is maintained at all times, said sump extending into the blisters 130 on opposite sides of the housing. Fluid is received in the sump from the valve 132, said fluid being discharged from said valve through the outlet slots 146 therein. Fluid enters the sump also, upon occasion, from a relief valve 155 presently to be described. Extending into the sump is an overflow pipe 156, the open inlet end of which is arranged at a suitable elevation to maintain the proper liquid level of the fluid in the sump. The pipe 156 extends downwardly from the sump, exteriorly of the housing 24, and at its lower end discharges into a reservoir of fluid 157 located in the lower part of said housing. Mounted at its middle upon the projecting forward end portion of spindle 139 of valve 132 is a balance arm 158 that extends in opposite directions therefrom into the respective blisters 130, the respective ends of said balance arm each having a hollow float 159 attached thereto. The arrangement is such that the floats 159 are supported by the surface of the liquid in the blisters. Since the surface of this liquid always is horizontally disposed, it follows that lateral tilting of the tractor will tilt the valve 132, causing the same to turn relatively of the spindle 139 thereof, with the result that the rotor 136 of the valve is rotated to a degree proportionate to the tilting of the tractor. A pendulous weight 160 attached to the hub of the balance arm supplements the floats to maintain the balance arm always in horizontal position.

Figure 10:
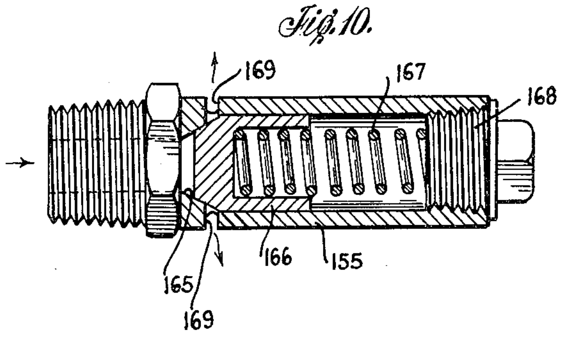
Fig. 10 is a diametric section through a relief valve that is operatively associated with the main valve of the apparatus.

Each fluid pressure cylinder 123 is charged and discharged by liquid that passes through a pipe 162 to the rear end thereof, which pipe is connected to one of the ducts or ports 147 of the valve 132. Each pipe 162 has a control valve 163 mounted therein, which valve may be closed in the event that the automatic leveling mechanism is not to be employed. Connected to one end of the inlet duct 144 of valve 132 is pipe 35 from the pressure side of oil pump 32, through which pipe oil under pressure is delivered to the said valve. The relief valve 155 hereinbefore mentioned is mounted in the other end of inlet duct 144 of valve 132. As shown in Fig. 10, the relief valve 155 is a hollow casing having an internal tapered valve seat 165 against which a complementally tapered valve 166 is urged by a coiled spring 167. The latter is retained in the casing by a cap or plug 168 threaded into an end of said casing. The wall of the casing is slotted at 169, 169, which slots extend to the valve seat 165 and constitute outlet ports. The relief valve 155 opens when the liquid pressure in duct 144 of valve 132 overcomes the force of spring 167, which may occur when control valves 163 of pipes 162 are closed, or when the tractor is on level terrain and the rotor 136 of valve 132 is in the position shown in Fig. 12. Liquid discharged from relief valve 155 is received in the sump 154. The reservoir 157 in the bottom of housing 24 has an outlet port 170, and connected to said port is the pipe 34, which is the inlet pipe to pump 32.

In the operation of the invention, the motor 23 is driven in the usual manner. When the clutch is closed and the gears in transmission casing 41 selectively meshed, the tractor is driven forward or backward as desired by the rotation of wheels 21. The motor 23 also drives the pump 32 to withdraw liquid from the reservoir 157 in housing 24, and to force said liquid, through pipe 35, to the inlet duct 144 of valve 132. When the tractor is moving over level terrain, that is, terrain that is horizontal transversely of the tractor, the rotor 136 of valve 132 is in the position shown in Fig. 12 and the spindles 77 of wheels 21 are in axial alignment. When the tractor moves onto uneven, transversely tilted ground, the tractor as a whole will tilt, including chamber 128. However, due to the fact that the surface of the liquid in sump 154 always is horizontal, the buoyant effect of the liquid acting upon one of the floats 159 of valve 132 will effect rotation of valve rotor 136 relatively to the valve casing. The result of such rotation is to bring the discharge end of duct 149 in rotor 136 at least partly into registry with the inner end of one of the ducts 147 in the casing, thus enabling pressure liquid to pass therethrough into one of the pipes 162 and enter one of the cylinders 123, Such rotation of the rotor 136 also brings one of its peripheral recesses 151 at least partly into registry with the other duct 147 in the casing, thus enabling pressure fluid in the other cylinder 123 to discharge therefrom through its pipe 162 and to escape from the valve 132 by way of said recess 151 and an outlet slot 146 with which the said recess is in communication at all times.

The charging of one cylinder 123 and concurrent discharging of the other moves the rack 121 longitudinally and thus imparts rotary movement to the pinion 119, and to bevel pinion 108 to which pinion 119 is operatively connected. Rotation of pinion 108 imparts rotary movement to the gear segments 106, in opposite directions, with the result that wheel arms 68 are correspondingly rotated, thus moving one of the wheels 21 upwardly and the other downwardly. Such movement of the wheels continues until the chassis of the tractor attains a transversely level position, at which position the rotor of valve 132 is in the central or neutral position shown in Fig. 12, and swinging movement of the wheel arms ceases. Such swinging movement of the wheel arms is limited in extent by the extent of axial movement of the pistons 124 in cylinders 123. In Figs. 1 and 2 the maximum extent of movement of the wheels 21 relatively to each other is indicated in dot and dash lines. It will be obvious that the action of the valve 132 is automatic and continuous, and that it adjusts the relative positions of the wheels 21 to compensate for every slope of the terrain within the limits set forth. The wheels 21 are power driven at all times, and the brake mechanism shown and described operates upon the wheel-drive with equal facility in all positions of the wheel-arms 68.

The invention provides a tractor that is capable of improved operation upon sloping terrain, that has a greater factor of safety than conventional tractors and which is less laborious to operate, and that achieves the other advantages set out in the foregoing statement of objects.

Figure 14:
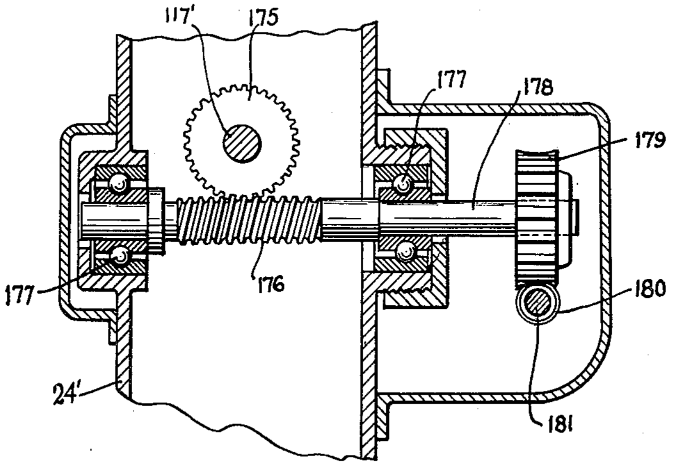
Figs. 14, 15 and 16 are somewhat diagrammatic views showing a modified means for moving the driving wheels of a tractor relatively of each other.
Figures 15, 16:
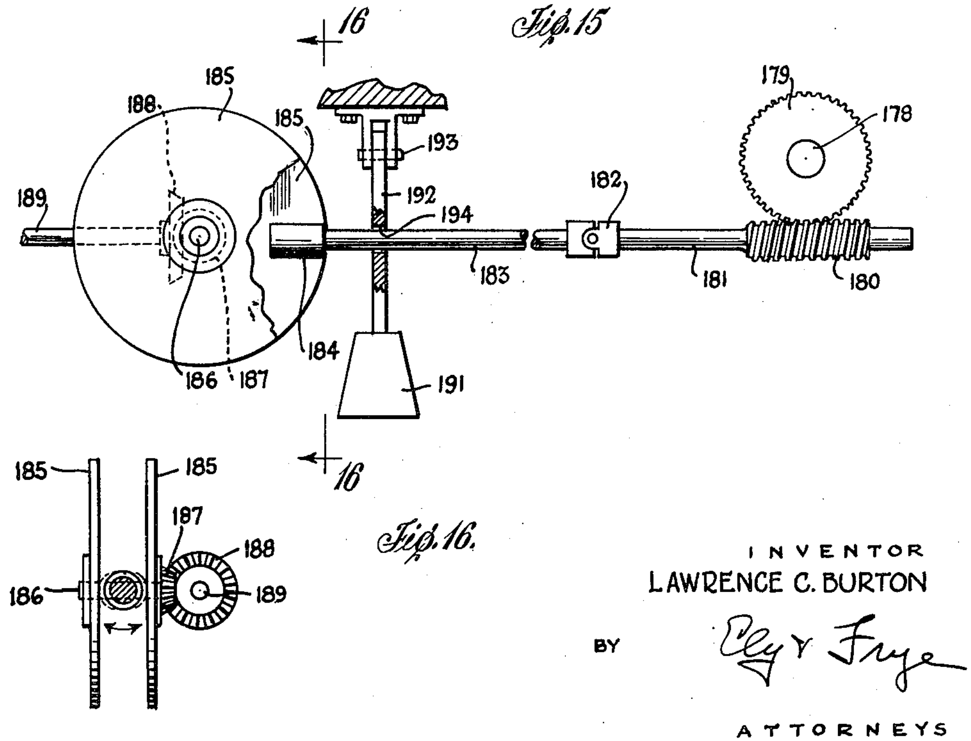

Referring now to Figs. 14, 15 and 16, there is shown, somewhat diagrammatically, another embodiment of means for effecting automatically the leveling of a laterally tilted vehicle. This embodiment of the invention is utilized for effecting mechanically the functions of the hydraulic mechanism of the previously described embodiment; more specifically, it may be employed in place of the pump 32, valve 132, cylinders 123, and the piping, sump, and reservoir of the structure previously described.

The housing 24′ of the modified structure is essentially similar to the housing 24 previously described and the mechanical elements therein are the same except that a worm wheel 175 is mounted upon the stem 117′ of the bevel pinion in place of the spur pinion 119 previously employed. Meshed with worm wheel 175 is a worm 176 that is suitably journaled in bearings 177 carried by opposite sidewalls of the housing, the shaft 178 of said worm extending through one of the sidewalls of said housing and having a worm wheel 179 mounted thereon. Meshed with the latter is a worm 180 formed on one end portion of a shaft 181, the other end of which shaft is connected by a universal joint 182 to a shaft 183. Shafts 181, 183 are substantially in axial alignment and substantially horizontally disposed, and extend forwardly from the housing 24′ toward the motor of the tractor. The end of shaft 183 remote from coupling 182 is provided with a short cylindrical roller 184 that is positioned between a pair of spaced apart discs 185, 185, which discs are mounted for concurrent rotation in the same direction upon a shaft 186. The latter is driven, through the agency of a pair of bevel gears 187, 188, by a rotatable shaft 189 that is driven by the tractor motor, and which may be the same shaft that drives the pump 32 of the first described embodiment of the invention.

The shaft 183 is adapted to oscillate in a horizontal plane about the coupling 182 as a pivot, which oscillation will move its end roller 184 alternatively into operative engagement with one or the other of discs 185. The confronting faces of the latter and the surface of roller 184 are of suitable composition so as to have good frictional engagement with each other, with the result that such engagement of roller and discs will drive the shaft 183, in one direction or the other, according to which disc is engaged by said roller. Oscillation of shaft 183 is effected in determinate relation to lateral tilting of the tractor, and to this end a pendulous weight 191 is suspended at the lower end of an arm 192 that is pivotally mounted at 193 upon any suitable part of the tractor structure, the axis of pivot 193 being parallel to the longitudinal axis of the tractor. The arm 192 is formed intermediate its ends with an aperture 194 through which the shaft 183 extends. The arrangement is such that the arm 192 always is urged toward vertical position by the static weight 191. Consequently, when the tractor tilts laterally, thus moving pivot point 193, the pivotal movement of the arm 192 suspended therefrom will move the shaft 183 and thus move the roller 184 on the end thereof into frictional driving engagement with one or the other of the discs 185. Rotation of the shaft 183, operating through the gearing previously described, rotates the gear 175 and stem 117′, and thereby moves the wheels of the tractor relatively of each other to bring the latter to a transversely level position in the manner provided in the first described embodiment of the invention. It will be understood, of course, that the discs 185 are driven in the proper direction to achieve the foregoing result. The distance between the pivot point 193 and aperture 194 in arm 192 determines the amount of leverage that said arm applies to shaft 183 to hold roller 184 in driving engagement with the discs 185.

Figure 17:
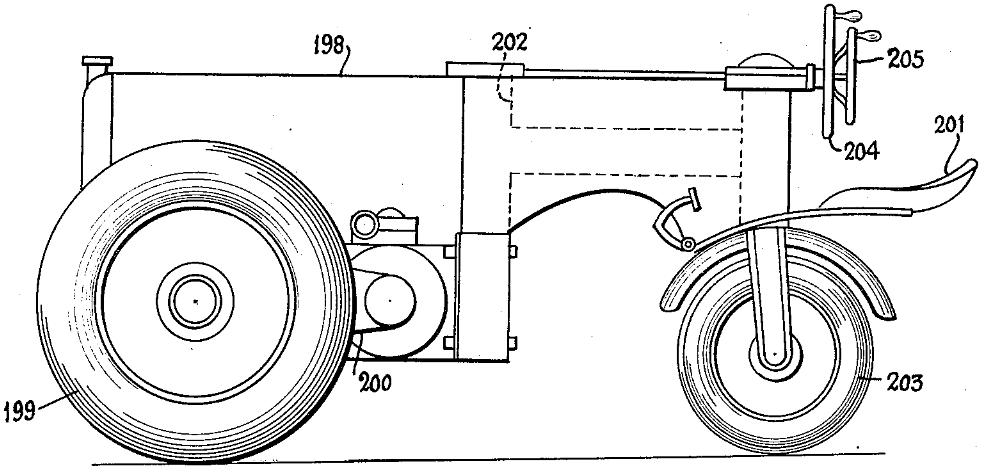
Fig. 17 is a side elevation of another embodiment of the invention as it appears on level terrain.
Figure 18:
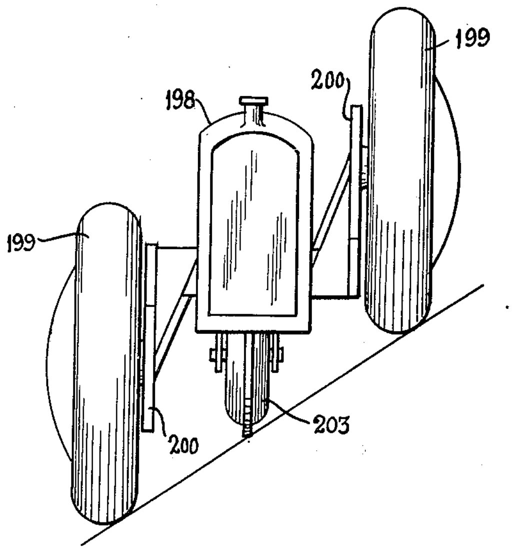
Fig. 18 is a front elevation of the tractor shown in Fig. 17 as it appears on the transversely sloped terrain.

Referring now to Figs. 17 and 18 of the drawings, there is shown a tractor 198 that differs from that previously described chiefly in the location of the driving wheels, designated 199, which are located at the front end of the tractor instead of at the rear thereof. As in the previously described embodiment of the invention, the wheels 199 are mounted upon the free ends of respective wheel-arms 200 that are hydraulically operated so as to automatically oscillate relatively of each other, as shown in Fig. 18, to compensate for uneven terrain upon which the tractor is operating, the wheel arms extending forwardly from their hub portions, and substantially horizontally when the tractor is on level ground.

The modified tractor also differs from that previously described by being articulated, its rear end portion, which includes the driver's seat 201, being capable of pivotal movement about a king pin located at 202. Said rear end portion of the tractor is provided with a single dirigible wheel 203 by means of which the tractor is steered, said wheel 203 being manually controlled by a steering wheel 204. A wheel 205 similar to the latter is provided for moving the rear end of the tractor angularly of the front end thereof, as is desirable in some operations for which the tractor is employed.

Although oil is mentioned as the liquid employed in the hydraulic mechanism of the tractor, it will be understood that other liquid may be employed, an important consideration being that the liquid should be substantially of uniform viscosity at all temperatures wherein tractor operation is practicable.

Other modification may be resorted to without departing from the spirit of the invention, or the scope thereof as defined by the appended claims.

What is claimed is:

1. A wheeled land vehicle comprising a chassis, wheels on opposite sides of the chassis supporting the same, and means controlled automatically by transverse tilting of the chassis out of horizontal position for concurrently raising one wheel and lowering the other wheel relatively of the chassis, said means comprising a spur pinion having a co-axially attached gear meshing, on opposite sides of its periphery, with gearing associated with the wheels, to move said gearing in opposite directions when the spur pinion is rotated, a rack meshed with said pinion, opposed fluid pressure operated cylinders engaging opposite ends of said rack to reciprocate the same, and means for charging one of said cylinders while discharging the other in proportion to transverse tilting of the chassis.

2. A vehicle as in claim 1, said cylinder charging means comprising a valve, a lever to operate said valve, a container having a liquid supply and float means on the said lever responsive to level of the liquid supply to operate the valve.

3. A self-leveling vehicle comprising a chassis, a driving shaft extending transversely of the chassis, an arm extending radially from each end of the shaft, a ground-engaging wheel mounted for rotation on the outer end of each arm, a pair of sprocket chains for imparting rotation from the driving shaft to the wheels, respectively, a sleeve attached to each arm and surrounding the said shaft, a ring gear attached to the inner end of each sleeve, a bevel gear between said ring gears and engaging the teeth of each of said ring gears, hydraulically operated means attached to the vehicle and arranged to rotate the said bevel gear, a valve in the said means controlling direction of rotation of said bevel gear, a liquid container attached to the vehicle, and float means in said container connected to said valve and responsive to liquid level in said container to operate the valve.

4. A device as in claim 3, said hydraulically operated means comprising a pair of cylinders in fluid communication with ports of said valve, and pistons in said cylinders having driving connections with said bevel gear.

5. In a device as in claim 3, a reservoir for hydraulic fluid, and said hydraulically operated means comprising a pair of cylinders in fluid communication with ports of said valve and pistons in said cylinders having driving connections with said bevel gear, said liquid container surrounding said valve whereby the latter receives its liquid supply from the valve, and an overflow pipe in said container in communication with said reservoir.

6. A self-leveling vehicle comprising a chassis, a driving shaft extending transversely of the chassis, an arm extending radially from each end of the shaft, a ground-engaging wheel mounted for rotation on the outer end of each arm, means for imparting rotation from the driving shaft to each wheel, a sleeve attached to each arm and surrounding said shaft, a hydraulic pressure system in the vehicle including a two-way valve, a pair of cylinders in communication with respective outlet ports of said valve, a container on the vehicle, having liquid-level-operated means responsive to sidewise tilting of the vehicle to operate said valve, and pistons in said cylinders, and means connected to said pistons and the respective sleeves to impart relatively opposite rotations thereto.

7. A vehicle as in claim 6, said valve-operating means comprising a container holding a liquid supply, and float means responsive to level of the liquid supply and connected to the valve.

8. In a vehicle as in claim 6, a reservoir for hydraulic fluid, and said container surrounding the valve and in communication with the exhaust ports thereof and said container having an overflow device in communication with said reservoir, and an operating lever on the valve and having float means responsive to height of liquid in the said container to operate the valve.

LAWRENCE C. BURTON.

REFERENCES CITED

The following references are of record in the file of this patent:

UNITED STATES PATENTS

| Number | Name | Date |
|---|---|---|
| 1,238,752 | Flory | Sept. 4, 1917 |
| 1,262,829 | Neumeier | Apr. 16, 1918 |
| 1,348,333 | Swan | Aug. 3, 1920 |
| 1,353,393 | Haupt | Sept. 21, 1920 |
| 1,385,417 | Wooley | July 26, 1921 |
| 1,451,194 | Adams | Apr. 10, 1923 |
| 1,821,271 | Musgrove et al. | Sept. 1, 1931 |
| 1,877,520 | MacGregor | Sept. 13, 1932 |
| 1,955,198 | Mellichampe | Apr. 17, 1934 |
| 1,990,798 | Richter et al. | Feb. 12, 1935 |
| 2,165,617 | Paes et al. | July 11, 1939 |
| 2,215,571 | White | Sept. 24, 1940 |
| 2,278,081 | Kramer | Mar. 31, 1942 |
| 2,302,322 | Howard | Nov. 17, 1942 |
| 2,387,249 | Eddington | Oct. 23, 1945 |

FOREIGN PATENTS

| Number | Country | Date |
|---|---|---|
| 346,890 | Italy | Mar. 11, 1937 |